United States Patent

[11] 3,622,619

[72] Inventors Erwin F. Schoenewaldt
 Watchung;
 George G. Hazen, Westfield; Richard F. Shuman, Westfield, all of N.J.
[21] Appl. No. 748,923
[22] Filed July 31, 1968
[45] Patented Nov. 23, 1971
[73] Assignee Merck & Co., Inc.
 Rahway, N.J.

[54] BIPHENYL COMPOUNDS
 2 Claims, No Drawings
[52] U.S. Cl.................................................. 260/476 C,
 260/479 R, 260/520, 260/620, 260/999
[51] Int. Cl........................................................C07c 69/78,
 C07c 69/14, C07c 65/04
[50] Field of Search........................................... 260/476 C,
 479, 543 F, 620

[56] References Cited
 UNITED STATES PATENTS
3,102,840 9/1963 Musser et al................. 260/479
 OTHER REFERENCES
 Journal Am. Chemical Society, Rae et al. Vol. 69 (509–10) (1947)
 Dewar et al., Vol. 88 (14) 3318– 27 (1966)
 Journal fur Prokt. Chem., Vol 28 (1930) pp. 63– 88 Steinkopf Primary Examiner—Lorraine A. Weinberger
Assistant Examiner—Jacqueline L. Davison
Attorneys—Michael C. Sudol, Jr., Harry E. Westlake, Jr. and I. Louis Wilk ABSTRACT: The invention relates to novel intermediates particularly 4-benzoyloxy-4'-(fluorosulfonyl) or (fluoro)biphenyl, which compounds are used to prepare 5-(4-fluorophenyl)salicylic acids and derivatives thereof which latter compounds are antiinflammatory agents.

BIPHENYL COMPOUNDS

This invention relates to and has for its object the provision of new methods for obtaining certain chemical compounds. It relates more particularly to methods for obtaining 5-(4-fluorophenyl)salicylic acid and the O-acetyl derivative thereof which may be characterized by the formula

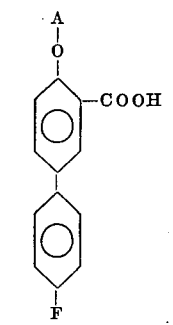

wherein A is either hydrogen or acetyl, and also to the novel intermediates themselves. Further, this invention relates to methods for obtaining intermediates which can be employed to obtain the compounds of formula I. These compounds are useful as anti-inflammatory agents, are effective in the prevention and inhibition of edema and granuloma tissue formation and have a useful degree of antipyretic and analgesic activity.

The present invention is based on the discovery that compounds of formula I can be obtained by the series of reactions which may be depicted by the following equation:

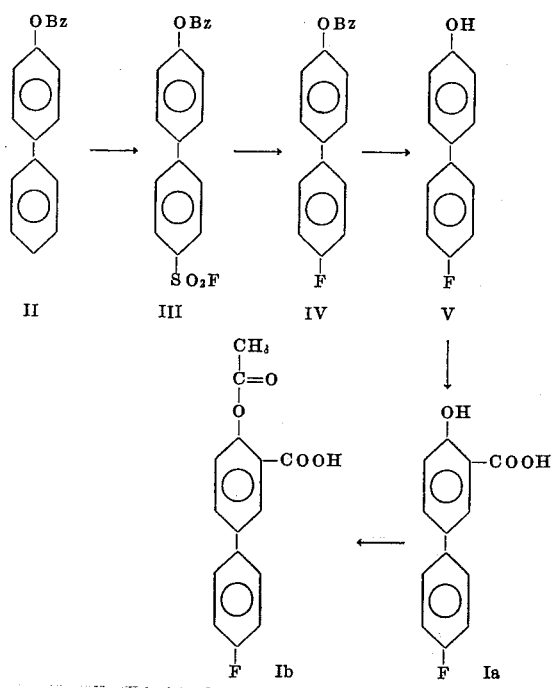

wherein Bz is an acyl radical such as benzoyl.

In accordance with the present invention, a 4-acyloxybiphenyl compound such as 4-benzoyloxybiphenyl of formula II is converted to a 4-acyloxybiphenyl-4'-fluorosulfonylbiphenyl compound such as 4-benzoyloxy-4-fluorosulfonylbiphenyl of formula III by reaction with a compound capable of providing the fluorosulfonyl radical. Suitable reactants include fluorosulfonic acid or chlorosulfonic acid-potassium fluoride. Reaction is attained at the temperature between the freezing point of the reaction mixture and reflux temperature. Desirable rates of reaction are attained between 0° C. and 100° C. The reaction product is conveniently cooled to a temperature of between about 0° C. and about 25° C., prior to pouring into cold water. The product is then separated from the reaction mixture by mixing with a solvent such as methylene chloride, benzene or ether and the extract can be subsequently water washed and dried. The product is isolated by removal of the solvent.

Alternatively, the 4-acyloxybiphenyl compound (e.g., 4-benzoyloxybiphenyl) may be sulfonated or chlorosulfonated and converted to the sulfonated derivative (e.g., 4-benzoyloxy-4'-fluorosulfonylbiphenyl) by reaction with fluorinating agents such as phosphorous pentafluoride, phosphorous oxyfluoride, potassium fluoride or hydrogen fluoride. Conversion to the metal sulfonate prior to fluorination is preferred.

The compound of formula III is converted to the corresponding 4'-fluoro compound (e.g., 4-benzoyloxy-4'-fluorobiphenyl) represented by formula IV. The reaction is effected by reaction with a reagent capable of converting the fluorosulfonyl radical to a fluorine radical in a manner such that sulfur dioxide gas is evolved. Transition metal complexes are effective catalysts. Representative of suitable catalysts are tris(triphenylphosphine)rhodium fluoride, tris(triphenylphosphine)-rhodium chloride, tetrakis(triphenylphosphine)ruthenium dichloride, bis(triphenyl phosphine)ruthenium carbonyl chloride, cobalt carbonyl, platinum and palladium catalysts. Desirable reaction rates are attained at a temperature in the range of from 25° C. to 400° C. The reaction product is recovered by crystallization and subsequently filtered, or by precipitation with a fluid such as petroleum ether, hexane or water, and subsequently filtered.

The compound of formula IV is then converted to the compound of formula V, 4-(4-fluorophenyl)phenol. Removal of the acyl (e.g., the benzoyl) radical from the O-acyl (e.g., the O-benzoyl) group to give a free hydroxy derivative is accomplished by solvolytic methods. "Solvolysis," in addition to covering various reactions known as "hydrolysis" involving aqueous reaction media, encompasses such acidolysis reactions which are conducted under substantially anhydrous conditions. Solvolysis can be effected under acidic, neutral or basic conditions. Under neutral conditions, the starting material is mixed with water and a solvent, if desired, and the mixture is allowed to stand until hydrolysis is effected. In most cases, it is desirable to heat the reaction mixture to a temperature in the range of 100° C. to 250° C. and to conduct the reaction in an autoclave. The rate of reaction is increased when the volume of water is in excess of that of the starting material. When a solvent is used, the preferred ones are those which are water-miscible solvents of the protic type. Among these are the lower alkanols, such as methyl and ethyl alcohol and benzyl alcohol.

The acyl radicals (preferably the benzoyl radical) can be removed by acid hydrolysis which is achieved by forming a mixture of the starting material in an aqueous acid. Reaction conditions can vary widely, however it is preferred to use a 10–50 percent acid solution and conduct the reaction at a temperature between room temperature and reflux temperature for a period of about 1–24 hours. The reaction mixture may contain, if desired, a solvent which is inert under reaction conditions and such a solvent can be miscible or immiscible, the former being preferred. Among the preferred miscible solvents are protic solvents such as lower alkanols, benzyl alcohol, and miscible organic acids.

Suitable acids for the purpose of hydrolysis are inorganic or organic acids, preferably strong acids such as hydrochloric, sulfuric and paratoluenesulfonic acids, but the choice of acids is not critical.

Basic hydrolysis can be used in place of acid hydrolysis. It is preferred to employ a 10 to 30 percent caustic solution for basic hydrolysis, with reaction being conducted between room temperature and reflux temperature for a period of from 1 to 4 hours. The reaction mixture can contain either an immiscible or miscible solvent which is inert under reaction conditions. Among the preferred solvents are lower alkanol and benzyl alcohol. Suitable basic compounds which can be employed are sodium methoxide and potassium butoxide, potassium hydroxide and lime, but the choice of the particular basic substance is not critical.

The 4-(4-fluorophenyl)phenol thus obtained is next converted to 5-(4-fluorophenyl)salicylic acid (Compound Ia, i.e., the compound of formula I wherein A is hydrogen). This can be effected by a carboxylation reaction, e.g., by reacting carbon dioxide with 4-(4-fluorophenyl)phenol in the presence of a basic catalyst. Among the catalysts which can be employed are sodium hydroxide, potassium hydroxide, potassium carbonate and sodium carbonate. The desired carboxylation reaction can be carried out at a temperature between the freezing point and the temperature at which undesirable decomposition of either the reactants or the product occurs. The more desirable reaction rates are obtained at a temperature within the range of 100° C. to 250° C.

In the final step, 5-(4-fluorophenyl)salicylic acid, is reacted with an acetylating agent to produce the desired product. The acetylating agents which can be employed in the process of this invention include ketene and compounds represented by the formula:

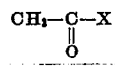

wherein X is the anion of an acid HX. Representative of the X anion are chloride, bromide, iodide, fluoride, azide, phenoxy, 2,4-dinitrophenoxy, phenylmercapto, p-nitrophenylmercapto, imidazolyl, alkoxy (e.g., methoxy, propoxy, butoxy, and the like), hydroxyl, carbodiimidoxyl, alpha,betaunsaturated alkanoxy (e.g., vinyloxy, allyloxy, isopropenyloxy, and the like), aliphatic acyloxy such as acetoxy, propionoxy, and the like, alkoxy carbamyloxy, organophosphato such as alkyl phosphato and dialkyl phosphato, dialkyl arseno, sulfonoxy (e.g., $-OSO_3-$), cyanoalkoxy and quaternary ammonium salts such as pyrrolinium and the like.

It is preferred to employ as acetylating agents, ketene, and the compounds wherein X is chloride (acetyl chloride), bromide (acetyl bromide), acetoxy (acetic anhydride), and isopropenyloxy (isopropenyl acetate). With the preferred acetylating agents, the reaction to produce 5-(4-fluorophenyl)acetyl salicylic acid proceeds relatively quickly. The acetylation reaction can be carried out in the presence of acidic or basic catalysts which promote acetylation or in the absence of a catalyst. Representative catalysts are bases such as triethylamine and pyridine; and acidic substances such as sulfuric acid and phosphoric acid, boron trifluoride, boron trifluoridemecuric oxide, p-toluenesulfonic acid, trifluoroacetic acid, sodium acetate, sodium formate, ion exchange resins, and the like. Preferred catalysts are pyridine, sulfuric acid and boron trifluoride.

The reaction is preferably carried out in the presence of a solvent which is not rapidly acetylated. Examples of these solvents are pyridine, benzene, toluene, dimethylformamide, acetone, carbon tetrachloride, chloroform, methylene chloride, acetic anhydride and acetic acid.

The reaction is carried out at temperature between the freezing point and the point at which undesirable decomposition of the starting material or reaction product occurs. It is preferred to operate at a temperature in the range of from about 0° C. to about 80° C.

Proportions of acetylating agent are not critical since product will be obtained with either reactant present in excess. When excess of acetylation agent is used, the anhydride of the compound of formula II and acetic acid, may be formed. If it is desired to avoid formation of anhydride, care must be taken not to have present during reaction excessive amounts of the acetylating reactant. However, if some anhydride is formed, it can be subsequently hydrolyzed as for example with aqueous acid to form 5-(4-fluorophenyl)acetyl salicylic acid. Preferably, the reaction is carried out with the acetylating reactant being present in amounts ranging from about 10 to about 10,000 percent, preferably from about 100 percent to about 500 percent in excess of the stoichiometric amount.

The reaction product is isolated, recovered and purified by conventional techniques such as by filtration, washing, evaporation, drying and recrystallization procedures.

The following examples are illustrative of the process of the present invention and are not intended to limit the same.

EXAMPLE 1

4-Benzoyloxy-4'-fluorosulfonylbiphenyl

One mole (274.3 g.) of 4-benzoyloxybiphenyl is added over 2 hours to 3 moles (300.2 g.) of fluorosulfonic acid at 70° C. When addition is complete, heating at 70° C. is continued for 3 hours. The reaction is cooled and poured into ice water. The quench mixture is extracted with three 1-liter portions of methylene chloride. The extract is washed with water and dried over sodium sulfate. Slow dilution with three liters of petroleum ether precipitates 4-benzoyloxy-4-fluorosulfonylbiphenyl.

Similarly, other 4-acyloxy compounds can be obtained by using different biphenyl starting materials in the procedure of example 1.

EXAMPLE 2

4-Benzoyloxy-4-fluorobiphenyl

One mole (324.3 g.) of 4-benzoyloxy-4'-fluorosulfonylbiphenyl is heated at 230° C. with 3 grams (0.00326 mole) of tris(triphenylphosphine)rhodium fluoride until evolution of sulfur dioxide ceases. The residue is recrystallized from ethanol to give 4-benzoyloxy-4-fluorobiphenyl, m.p. 159°–163 °C.

Using other 4-acyloxy starting materials in the foregoing procedure leads to the corresponding 4-acyloxy-4'-fluorosulfonylbiphenyl products.

EXAMPLE 3

4-(4-Fluorophenyl)phenol

Six grams (0.0206 mole) of crude 4-benzoyloxy-4'-fluorobiphenyl are slurried in 100 ml. of 50 percent aqueous ethanol. Four grams (0.10 mole) of sodium hydroxide are added and the mixture heated to reflux for 5 minutes. The hot solution is cooled and filtered. The filtrate is acidified to pH 2.0 with hydrochloric acid. The precipitated crude 4-(4-fluorophenyl)phenol is filtered, washed with water and dried. Yield, 3.7 g., melting range 145°–155° C. The crude phenol is purified by chromatography over silica gel.

Other 4-acyloxy starting materials can be used in example 3 to give the same final product.

EXAMPLE 4

5-(4-Fluorophenyl)salicylic Acid

One hundred grams of 4-(fluorophenyl)phenol were finely ground with 300 g. of anhydrous potassium carbonate. The mixture was placed in an autoclave under 700–800 p.s.i.g. of dry carbon dioxide and heated at 235°–245° C. for 6 hours. The mixture was cooled and slurried in 1.5 liters of water. The crude potassium 5-(4-fluorophenyl)salicylate was filtered. The wet cake was reslurried in 5 liters of water. This mixture was filtered and the filtrate acidified with concentrated hydrochloric acid to precipitate 5-(4-fluorophenyl)salicylic acid. Yield, 92 g. m.p. 202°–204° C.

EXAMPLE 5

0-Acetyl 5-(4-fluorophenyl)salicylic Acid

To 1 gram (4.3 millimoles) of 5-(4-fluorophenyl)salicylic acid and 2 grams (21.2 millimoles) of acetic anhydride were added 40 microliters of concentrated sulfuric acid with agitation at 25° C. The temperature was allowed to rise to 32° C. and was held at 32° C. for 5 minutes. Twenty microliters of water were slowly added to the reaction mixture with the temperature being allowed to rise to 40° C. The resultant mixture was stirred for 5 minutes at 40° C. The product, 0-acetyl 5-(4-fluorophenyl)salicylic acid was crystallized and filtered from the reaction mixture. The filtered product was washed with 10 ml. of water and dried at 60° C. to constant weight. The yield was 1.16 grams of product, m.p. 130°–145° C.

One gram of 0-acetyl 5-(4fluorophenyl)salicylic acid thus produced was dissolved in 80 ml. of hot carbon tetrachloride and cooled to 70° C. Fifty mg. of decolorizing charcoal were added to the product which was subsequently refluxed for 15 minutes with agitation. The carbon was collected by filtering the hot solution and the filter cake was washed with 2 ml. of hot carbon tetrachloride. The combined filtrates and wash were concentrated to 50 ml. "in vacuo." The resulting slurry was heated to reflux and cooled at 20° C. per hour to 25° C. After two hours at 25° C., the 0-acetyl 5-(4-fluorophenyl)salicylic acid was filtered, the cake recovered and washed with 2 ml. of carbon tetrachloride, and then 5 ml. of hexane and finally dried "in vacuo" at 60° C. to constant weight. The amount of product recovered was 0.75 gram.

We claim:

1. The compound of the formula:

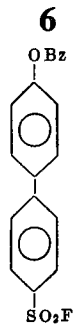

wherein Bz is a benzoyl radical.

2. The compound of the formula:

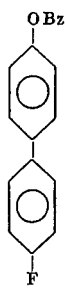

wherein Bz is a benzoyl radical.

* * * * *

UNITED STATES PATENT OFFICE
CERTIFICATE OF CORRECTION

Patent No. 3,622,619      Dated November 23, 1971

Inventor(s) Erwin F. Schoenewaldt et al.

It is certified that error appears in the above-identified patent and that said Letters Patent are hereby corrected as shown below:

In column 3, line 5, between the words "butoxide," and "potassium" insert ---or the strong inorganic bases such as sodium hydroxide---.

Signed and sealed this 25th day of April 1972.

(SEAL)
Attest:

EDWARD M. FLETCHER, JR.
Attesting Officer

ROBERT GOTTSCHALK
Commissioner of Patents